United States Patent
Saeki

(10) Patent No.: US 8,054,303 B2
(45) Date of Patent: Nov. 8, 2011

(54) TRANSMITTER AND RECEIVER CAPABLE OF REDUCING CURRENT CONSUMPTION AND SIGNAL LINES FOR DATA TRANSFER

(75) Inventor: Yutaka Saeki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 960 days.

(21) Appl. No.: 12/010,263

(22) Filed: Jan. 23, 2008

(65) Prior Publication Data

US 2008/0180417 A1 Jul. 31, 2008

(30) Foreign Application Priority Data

Jan. 25, 2007 (JP) ................................ 2007-015263

(51) Int. Cl.
*G06G 5/00* (2006.01)

(52) U.S. Cl. ........... 345/204; 455/566; 345/99; 345/213

(58) Field of Classification Search .................. 345/204, 345/87–101, 211–213; 455/566; 710/1, 710/65, 69, 71
See application file for complete search history.

(56) References Cited

U.S. PATENT DOCUMENTS

| | | | | |
|---|---|---|---|---|
| 4,377,843 A * | 3/1983 | Garringer et al. | ............... | 710/71 |
| 5,805,125 A * | 9/1998 | Suganuma et al. | ............. | 345/87 |
| 6,456,111 B1 * | 9/2002 | Yamaguchi | ...................... | 326/86 |
| 6,597,229 B1 * | 7/2003 | Koyata et al. | ................. | 327/333 |
| 7,176,709 B2 * | 2/2007 | Uematsu | .......................... | 326/30 |
| 7,492,361 B2 * | 2/2009 | Kawachi et al. | ............... | 345/204 |
| 7,610,419 B2 * | 10/2009 | Hashimoto et al. | ............. | 710/71 |
| 7,633,312 B2 * | 12/2009 | Saeki | .............................. | 326/83 |
| 7,787,910 B2 * | 8/2010 | You | ................................ | 455/566 |
| 2002/0027541 A1 * | 3/2002 | Cairns et al. | ..................... | 345/87 |
| 2005/0265526 A1 * | 12/2005 | Saeki | .......................... | 379/90.01 |
| 2007/0037604 A1 * | 2/2007 | You | ................................ | 455/566 |
| 2009/0264160 A1 * | 10/2009 | Mochizuki et al. | ............ | 455/566 |

FOREIGN PATENT DOCUMENTS

JP 2001-53598 2/2001
JP 2003-323147 11/2003

* cited by examiner

*Primary Examiner* — Lun-Yi Lao
*Assistant Examiner* — Tom Sheng
(74) *Attorney, Agent, or Firm* — McGinn IP Law Group, PLLC

(57) ABSTRACT

A transmitter includes a pair of output terminals which output an image data, and a transmitting unit. When the transmitting unit outputs the image data, a first output terminal of the pair is connected to a reference electric potential and a second output terminal of the pair is to a floating state, based on the image data. When the transmitting unit does not output an image data, the first and second output terminals of the pair become to a floating state.

2 Claims, 9 Drawing Sheets

TRANSMITTER AND RECEIVER CAPABLE OF REDUCING CURRENT CONSUMPTION AND SIGNAL LINES FOR DATA TRANSFER

BACKGROUND OF THE INVENTION

1. Field of the Invention

The present invention relates to transmission and reception technology, specifically, the technology of transmitting and receiving data among semiconductor integrated circuits.

2. Description of Related Art

As the semiconductor technology advances, information processing devices each containing a high-density semiconductor integrated circuit have become prevalent. In these information processing devices, data are transmitted through a transmission path among semiconductor integrated circuits. The semiconductor integrated circuit on the transmitting side of data includes a transmitter circuit (hereinafter referred to as "the transmitter circuit"), and the semiconductor integrated circuit on the receiving side of data includes a receiver circuit (hereinafter referred to as "the receiver circuit.")

Due to a massive volume of data being processed by the information processing devices in recent years, it has become necessary to accelerate the transmission speed of data among the semiconductor integrated circuits in order to achieve a high transmission speed of processing devices. On the other hand, it is also required to reduce the power consumption of information processing devices and to reduce power required for data transmission. Particularly, in the case of mobile terminals such as PDA and mobile phone that have become rapidly prevalent lately, it is rigorously required to reduce the power consumption of component parts, and the component parts responsible for the transmission of display data between the housing and the display panel are not exempt from such requirement.

In the case of data transmission technology by voltage signals, any attempt to accelerate voltage signals results in delays because of parasitic capacity of the transmission path and thus there is a limit to the acceleration of voltage signals. Japanese Patent Application Laid Open Application No., 2001-052598 discloses a technology of accelerating the transmission of data among semiconductor integrated circuits by transmitting data with electric current signals. This technology can contain the effect of parasitic capacitance of the transmission path and achieve a high transmission speed of signals. The technology of providing the power source in the receiving unit without providing one in the transmitting unit is disclosed so that the work of designing the transmitting unit may be facilitated without the necessity of changing the specification on the transmitter side even if the number of receiving units has change.

Specifically, a pair of wiring cables is provided to transmit signals between the transmitter circuit and the receiver circuit, and in the transmitter circuit one of the wiring cables is connected with the ground electrode and the other is kept in the floating state (high-impedance state). This leads to the flow of electric current in the wiring cables extending from the power source provided in the receiver circuit to the ground electrode and no flow of current to the other wiring cables. As a result, complimentary current signals can be transmitted by a pair of wiring cables. This transmission method is referred hereinafter to as "the CMADS (Current Mode Advanced Differential Signaling).

Lately, small display devices such as mobile telephone in particular include the function of decreasing the amount of image data such as subtractive color mode. This function reduces the amount of data transmitted between the housing and the display panel from 18 bits to 3 bits by reducing for example the image data in 260,000 colors to eight colors.

In the case of transferring image data by reducing their amount in this way, a dummy transfer is carried out other than that of the data required for the display of images. While the dummy transfer is going on, no image data are outputted from the transmitting unit.

However, as current continues flowing in the wiring cables between the transmitting unit and the receiving unit in spite of the fact that no image data are transmitted while the dummy transfer is going on, useless power is consumed.

Taking note of this issue, Japanese Patent Laid Open Application No. 2003-323147 displays the technology of reducing power consumption in the transfer of data by the CMADS method. This technology reduces power consumption by cutting off current flowing in the wiring cables when no image data are outputted from the transmitting unit.

FIG. 10 shows a schematic illustration of data transmission by this technology. Between the transmitting unit 210 for transmitting data (V-I conversion circuits 8 and 9 in FIG. 1 of the $2^{nd}$ patent application) and the receiving unit 220 for receiving data (I-V conversion circuits 21 and 22 in FIG. 1), two transmission paths, i.e., data transmission path 230 and clock transmission path 240 and STP signal line 250 (wiring cables 11 in FIG. 1) are provided.

The data transmission path 230 includes a pair of wiring cables (data line 230*a* and data line 230*b*: wiring cables 4a and 4b in FIG. 1) provided between the transmitter circuit 212 in the transmitting unit (V-I conversion circuits 8 and 9 in FIG. 1) and the receiver circuit 222 in the receiving unit 220 (I-V conversion circuit 21 in FIG. 1). The clock transmission path 240 includes a pair of wiring cables (clock line 240*a* and clock line 240*b*: wiring cable 5a and 5b in FIG. 1) provided between the transmitter circuit 214 in the transmitting unit 210 (V-I conversion circuit 9 in FIG. 1) and the receiver circuit 224 in the receiving unit 220 (I-V conversion circuit 22 in FIG. 1).

The STP signal line 250 is provided to allow the flow of signals for controlling whether electric current should be allowed to flow in the data transmission path 230 and the clock transmission path 240 (receiver control signal described in Patent Document 2, referred hereinafter to as "STP signal"), and is a CMOS (Complimentary Metal Oxide Semiconductor) signal line. The STP signal is outputted by a timing control circuit not shown. This signal is a signal for indicating whether the transmitting unit is outputting image data.

The receiving unit 220 receives image data by allowing electric current flow in the data transmission path 230 and the clock transmission path 240 when it is receiving this STP signal and the transmitting unit 210 is outputting image data. On the other hand, when the transmitting unit 210 is not outputting image data, it operates in such a way that current may not flow in the data transmission path 230 and the clock transmission path 240. In this way, it is possible to realize a low level of power consumption in the case of image data transmission based on a reduced number of colors.

Also, taking note of the uniform data of each pixel in the case of uniform images such as for example the totally white display, the $2^{nd}$ patent application discloses a technology of restricting power consumption by cutting off current in the transmission path when the same data continue during a transfer of data. For this operation, the output of image data is interrupted and STP signals are outputted to the receiving unit 220 when the data to be transmitted and the data that had been transmitted a drive timing before are identical. Upon receipt of the STP signal, the receiving unit 220 operates to block the flow of current in the data transmission path 230 and the clock transmission path 240. This results in the subsequent data not being received when the same data continue. In the normal state, the receiving unit 220, generates data for display DATA OUT based on the data received and outputs the same in the image display unit not shown, and when the STP signals are high, the same data as the data generated for display DATA OUT based on the data transmitted a drive timing before are outputted. This process enables to accelerate data transmission, and at the same time enables to contain power consumption by reducing the amount of image data to be transmitted when uniform images such as wholly white display are to be displayed and by interrupting the supply of power to the transmission path when image data are not transmitted.

Incidentally, in the case of mobile phone for example, due to a slender construction of the hinge between the housing and the display panel adopted in consideration of the design aspect, voices are raised requesting to reduce as far as possible the wiring cables for data transmission between the housing and the display panel. In view of such an opinion, the technology described in the $2^{nd}$ patent application increases the wiring cable for STP signals between the transmitting unit 210 and the receiving unit 220.

SUMMARY

An exemplary aspect of the present invention is a transmitter. This transmitter includes a pair of output terminals which output an image data, a transmitting unit, which, when the image data is outputted, connects a first output terminal of the pair to a reference electric potential and make a state of a second one of the pair in a floating state, based on the image data, when the image data is not outputted, which makes a state of the first and second output terminals of the pair in a floating state.

Another exemplary aspect of the present invention is a receiver. This receiver includes a pair of input terminals which receive an image data, a receiving unit which generates a pair of complimentary current signals based on a state of said pair and generates a display signals based on said pair of complimentary current signals; and a control unit generates a control signal which indicates whether the image data have been received or not, based on the state of said pair.

By using the transmission and reception technology according to the present invention, it will be possible to achieve low power consumption and to restrict the number of wiring cables for transferring data by electric current signals among semiconductor integrated circuits.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENT

Figure 1:
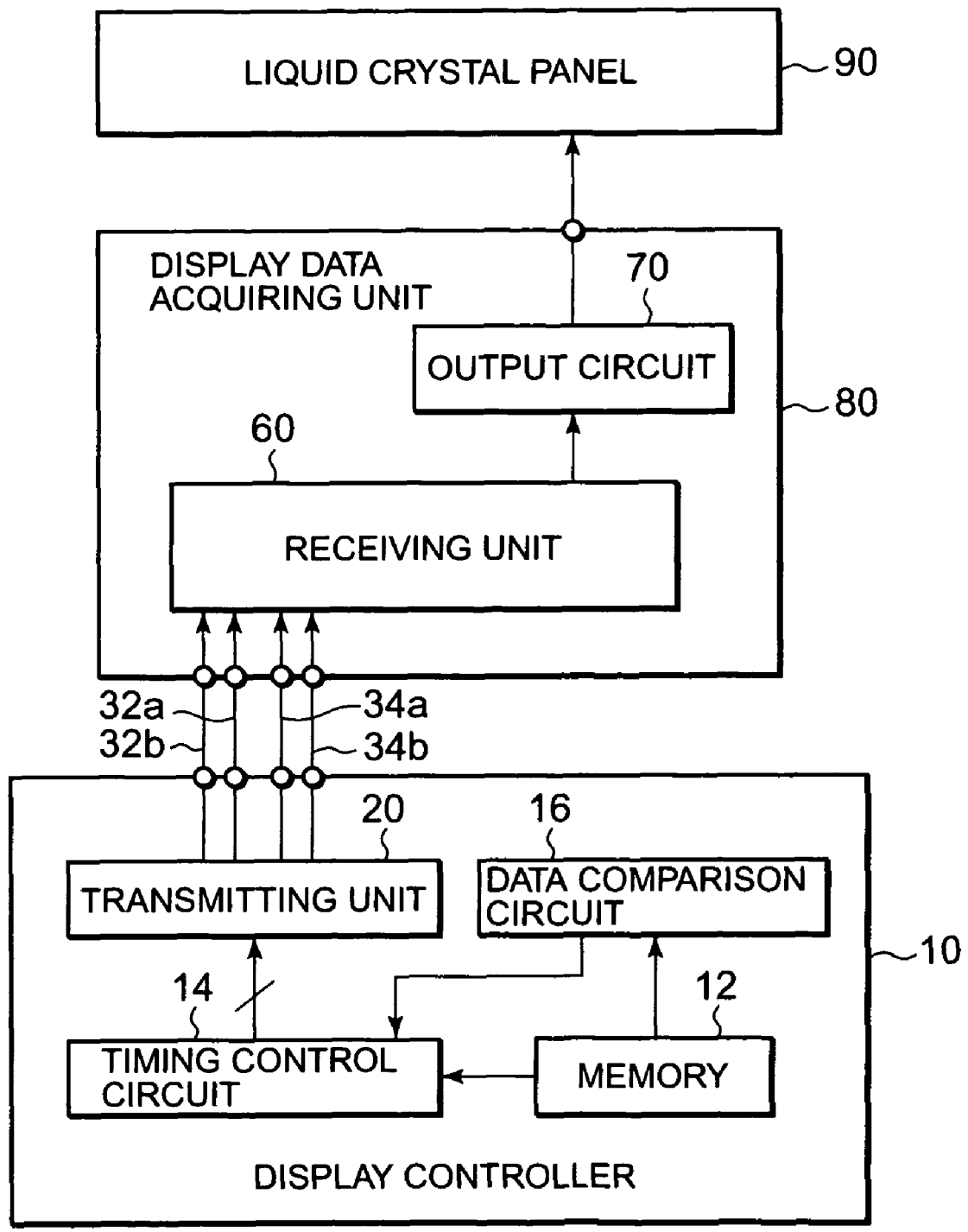
FIG. 1 is an illustration showing the configuration of an image display device according to the embodiment of the present Invention.

FIG. 1 shows the configuration of an image display device 100 by the embodiment of the present Invention. The image display device 100 is, for example, mounted on a mobile phone.

As shown in FIG. 1, the image display device 100 includes a display controller 10, a display data acquisition unit 80, and a liquid crystal panel 90. Between the display controller 10 and the display data acquisition unit 80, two pairs of wiring cables, i.e., data line 32a and data line 32b, as well as clock line 34a and clock line 34b are provided. The display controller 10 is contained in the housing of the mobile phone not shown, and two pairs of wiring cables are laid within the hinge not shown.

The display controller 10 receives the input of image data from outside in the form of digital binary voltage signals, and outputs these image data in each line of image. The display controller 10 includes a memory 12, a timing control circuit 14, a data comparison circuit 16, and a transmitting unit 20.

The memory 12 takes the input of image data from outside and holds a predetermined amount of image data, for example image data sufficient for a screen.

The timing control circuit 14 reads a predetermined amount of image data from the memory 12, for example those sufficient for a line, generates clock signals and output the same to the transmitting unit 20. The timing control circuit 14 includes a first control unit for outputting STP signals constituting the first control signal in addition to image data and clock signals, and outputs the STP signals to the transmitting unit 20. This output is carried out based on the output signals coming from the data comparison circuit 16.

The data comparison circuit 16 is connected with the memory 12 and the timing control circuit 14, stores temporarily the image data that the timing control circuit 14 had read from the memory 12, and compares this image data with the image data that the timing control circuit 14 reads subsequently from the memory 12. This comparison is carried out for example with the image data of the adjacent pixel. The data comparison circuit 16 outputs signals showing the result of this comparison to the timing control circuit 14.

The timing control circuit 14 turns the STP signal that it outputs to the transmitting unit 20 into a low value or a high value based on the output signal from the data comparison circuit 16. Specifically, when the compared image data are different, this is considered as a normal state and the STP signal is set at a low value, and when the compared image data are the same, the STP signal is set at a high value.

The details of the transmitting unit 20 will be described below.

The display data acquisition unit 80 includes a receiving unit 60 and an output circuit 70. The receiving unit 60 generates display data which are driving signals for displaying images at the liquid crystal panel 90 based on the image data received from the transmitting unit 20 of the controller 10, and the output circuit 70 outputs the display data to the liquid crystal panel 90.

The liquid crystal panel 90 receives the display data that had been transmitted from the output circuit 70 of the display data acquisition unit 80 and displays images.

Figure 2:
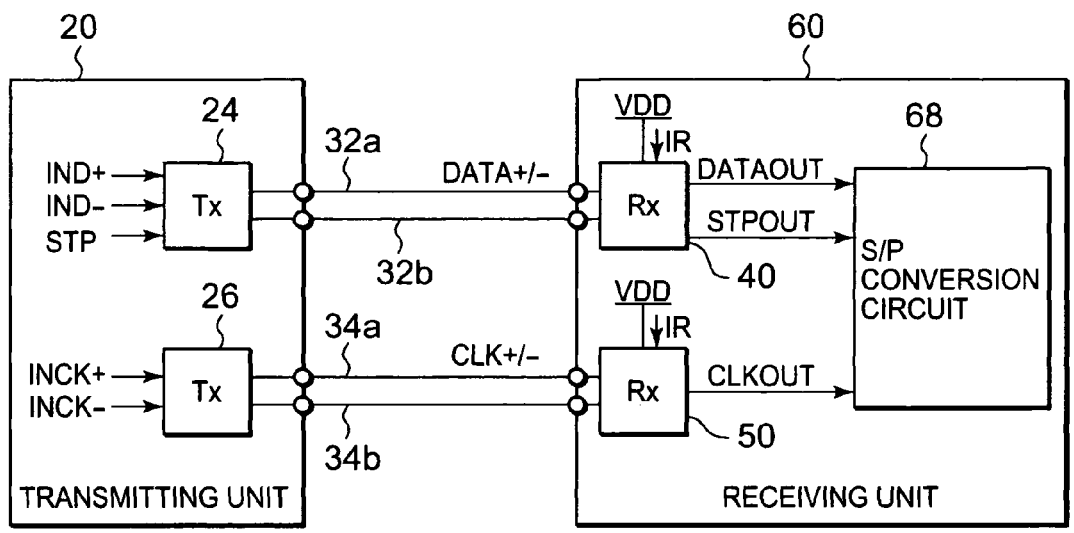
FIG. 2 is an illustration showing the configuration and the connection mode of the transmitting unit and the receiving unit in the image display device shown in FIG. 1.

FIG. 2 shows the configuration of the transmitting unit 20 and the receiving unit 60 in the image display device 100 shown in FIG. 1 and the details of connecting mode of the transmitting unit 20 and the receiving unit 60.

The transmitting unit 20 includes a transmitter circuit 24 for image data and a transmitter circuit 26 for clock signals. Incidentally, the transmitter circuit 24 receives the input of image data (IND+ and IND−) which are binary voltage signals and STP signals from the timing control circuit 14.

The receiving unit 60 includes a receiver circuit 40 for image data, a receiver circuit 50 for clock signals and a S/P conversion circuit 68. The receiver circuit 40 generates image data DATAOUT which are voltage signals and STP signals (referred to herein as STPOUT in order to distinguish from the STP signals inputted into the transmitter circuit 24) based on the image data (DAT+ and DATA−) which are current signals that had flown from the transmitter circuit 24 of the transmitting unit 20 and outputs the same to the S/P conversion circuit 68, and the receiver circuit 50 generates the clock signals CLKOUT for the S/P conversion circuit based on the clock signals (CLK+ and CLK−) that had flown from the transmitter circuit 26 and outputs the same to the S/P conversion circuit 68. The S/P conversion circuit 68 includes a latch circuit and the like not shown, and generates display data by serial-parallel conversion, selection of gradation and other processing based on DATAOUT from the receiver circuit 40 and the receiver circuit 50, STPOUT, and CLOKOUT.

Data line 32*a* and data line 32*b* are provided between the transmitter circuit 24 and the receiver circuit 40, and clock line 34*a* and clock line 34*b* are provided between the transmitter circuit 26 and the receiver circuit 50.

Here, we shall now describe the transmitter circuit 24 for image data and the receiver circuit 40 for image data.

Figure 3:
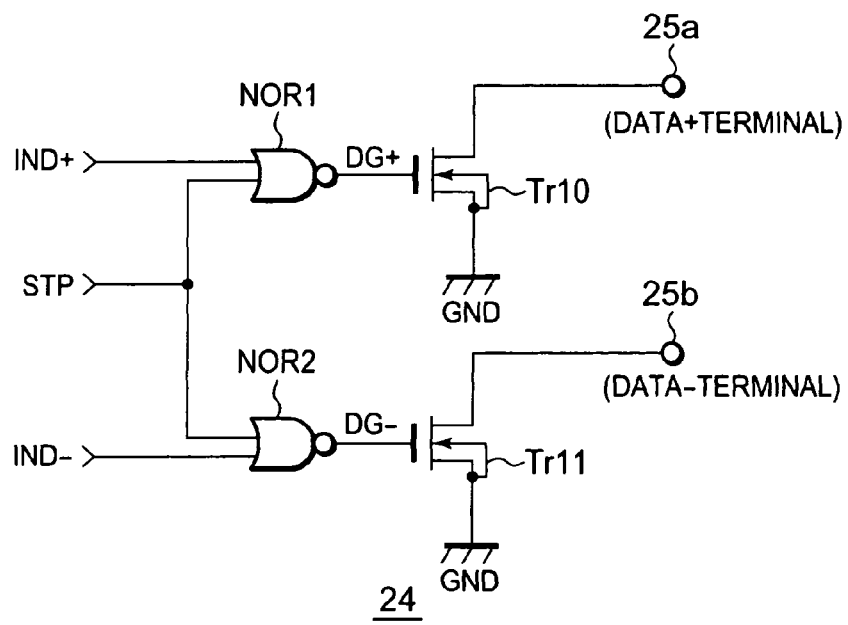
FIG. 3 is an illustration showing the configuration of the transmitter circuit for image data in the transmitting unit shown in FIG. 2.

FIG. 3 shows the configuration of the transmitter circuit 24. The transmitter circuit 24 includes two NOR logics NOR 1 and NOR 2, and two N-channel open drain transistors Tr 10 and Tr 11 respectively connected with these two NOR logics. The signals IND+ and IND− are respectively inputted to NOR 1 and NOR 2. The transmitter circuit 24 is connected with the data line 32*a* and the data line 32*b* through the DATA+ terminal 25*a* and the DATA− terminal 25*b*.

Since the image data IND+ and IND− are mutually inverted signals, when the STP signal is low, mutually inverted signals (DG+ and DG−) are inputted to the gate terminals of the Tr 10 and Tr 11. As a result, one of the Tr 10 and Tr 11 is turned ON and the other is turned OFF. Current flows in the data line connected with the transistor that has been turned ON among the data line 32*a* and the data line 32*b* from the power source provided in the receiving unit 60 (we shall describe the details later on), and current does not flow in the other data line.

As a low signal is inputted to the gate terminals of the Tr 10 and Tr 11 when the STP signal is high, both the Tr 10 and the Tr 11 are turned OFF. In other words, in this case, no current flows in any of the data line 32*a* and the data line 32*b*.

Figure 4:
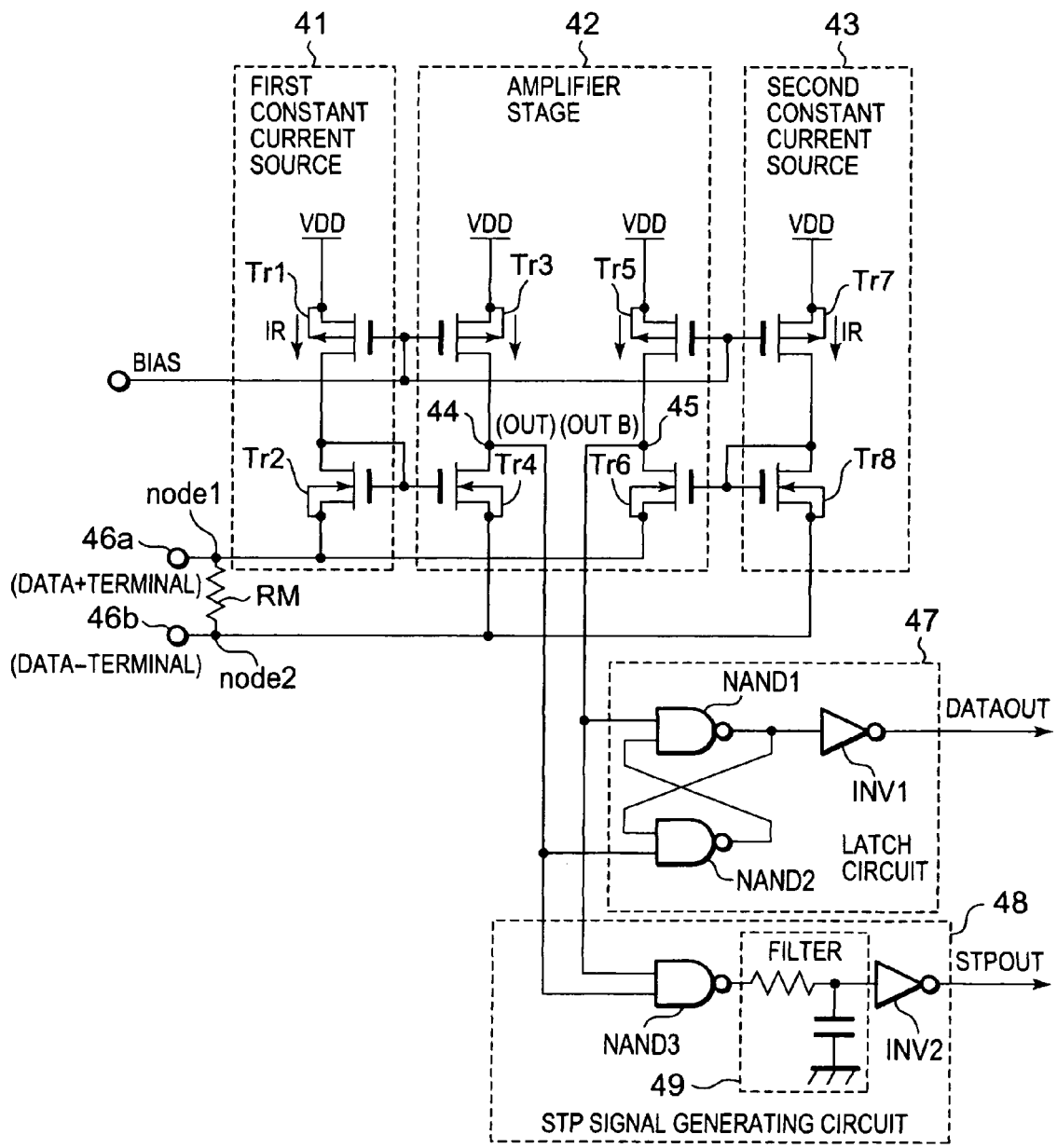
FIG. 4 is an illustration showing the configuration of the receiver circuit for image data in the receiving unit shown in FIG. 2.

FIG. 4 shows the configuration of the receiver circuit 40. The receiver circuit 40 includes a first constant current source 41 and a second constant current source 43 generated by the voltage supplied from the bias (BIAS in the figure), an amplifier stage 42, a latch circuit 47 and a STP signal generating circuit 48.

The first constant current source 41 is a current mirror constant current source, and includes a P-channel MOS transistor Tr1 and a N-channel MOS transistor Tr 2. The second constant current source 43 is a current mirror constant current source and includes a P-channel MOS transistor Tr7 and a N-channel MOS transistor Tr8. The amplifier stage 42 includes P-channel MOS transistors Tr3 and Tr5 and N-channel MOS transistors Tr 4 and Tr 6.

The source of Tr1 and that of Tr 3 are connected with the power line VDD. The gate of Tr1 and that of Tr3 are connected each other, and BIAS is applied to each gate. The gate of Tr2 and that of Tr4 are connected each other, and the gate of Tr8 is short-circuited with the drain of Tr8.

The source of Tr1 and that of Tr3 are connected with the power line VDD. The gate of Tr 5 and that of Tr7 are connected each other, and BIAS is applied to each gate. The gate of Tr6 and that of Tr8 are connected each other, and the gate of Tr8 is short-circuited with the drain of Tr8.

The source of Tr 2 and that of Tr 6 are short-circuited and are connected with the terminal 46*a*. The source of Tr 4 and that of Tr 8 are short-circuited, and are connected with the terminal 46*b*.

The dimensional relationship between various transistors fulfills the requirement of Tr 1:Tr 3=Tr 7:Tr 5=Tr 2:Tr 4=Tr 8:Tr 6=n:1 (n: integer equal to 1 or more).

Image data are inputted from the DATA+ terminal 46*a* and the DATA− terminal 46*b* respectively connected with the two data lines (data line 32*a* and data line 32*b*), and two output signals are generated in response to these image data, and are supplied from the OUT terminal 44 and the OUT_B terminal 45 to the latch circuit 47 and STP signal generating circuit 48. A terminal resistance RM is provided between the node 1 and node 2 for enabling the desired amplitude voltage to be supplied in response to the current flowing between these two nodes.

The latch circuit 47 includes two NAND logics NAND 1 and NAND 2, and an inverter INV 1. The NAND 1 and the NAND 2 constitute a RS latch circuit. This RS latch circuit shapes the waveform of signals coming from the OUT terminal 44 and OUT_B terminal 45 and stores the same, and the inverter INV 1 inverts the output of this RS latch circuit to obtain image data DATAOUT.

The STP signal generating circuit 48 is the second control unit of the present Invention and generates STPOUT which is the second control signal. The STP signal generating circuit 48 includes a NAND logic NAND 3, a filter 49 and an inverter INV 2. The INV 2 inverts the output of NAND 3 to obtain STPOUT. The filter 49 removes the surge waveform of the output of NAND 3 before the same is inputted to the INV 2. Although we shall describe the details later on, the STPOUT is used to decide whether the S/P conversion circuit 68 take in serial-parallel converted data, or hold the previous data without taking them in. Specifically, if the STPOUT is low, the serial-parallel converted data are taken in as they are. If the STPOUT is high, when the serial data taken in by this timing is converted into parallel data, the same is not taken in and the previous data are maintained.

Here, we shall describe the operation of the transmitter circuit 24 and the receiver circuit 40. To begin with, we shall describe the case in which the STP signal inputted into the transmitter circuit 24 is low.

As shown in FIG. 3, when the STP signal inputted into the transmitter circuit 24 is low, the Tr 10 and the Tr 11 are respectively turned ON and OFF, and current flows in the data line connected with the transistor that is turned ON. As a result, mutually inverted signals (DG+ and DG−) are inputted into the gate terminal of the Tr 10 and the Tr 11.

In other words, in this state, image data DATA+/− which are mutually inverted current signals are transmitted in the data line 32a and the data line 32b.

Now, let us consider on the case where the Tr 10 is turned OFF and the Tr 11 is turned ON. In this case, the DATA+ terminal 25a of the transmitter circuit 24 is in a floating state (high impedance), and the DATA− terminal 25b has a voltage close to GND.

At this time, in the receiver circuit 40 for image data shown in FIG. 4, the DATA+ terminal enters also in the floating state, and the current IR from the first constant current source 41 flows in the path of Tr 1→Tr 2→DATA+ terminal 46b, and the current (<IR in the same way) from the second constant current source 43 flows in the path of Tr 7→Tr 8→DATA− terminal 46a. As a result, an amplitude voltage V (V=IR×RM) is generated in the terminal resistance RM. As the voltage of the DATA+ terminal 46a is higher by V than that of the DATA− terminal 46b, the Tr 4 gets closer to ON state and the Tr 6 gets closer to OFF in the amplifier stage 42, and the output of the OUT terminal 44 and the OUT_B terminal 45 respectively turns low and high. Accordingly, the OUT terminal 44 outputs at a low level and the OUT_B terminal 45 outputs at a high level. The DATAOUT from the latch circuit 47 are outputted at a high level. On the other hand, the STP signal generating circuit 48 outputs the STPOUT at a low level because the signals inputted into NAND 3 (the signals from the OUT terminal 44 and the signals from OUT_B terminal 45) are mutually inverted signals.

When the Tr10 is turned ON and the Tr11 is turned OFF, the DATA− terminal 25b gets in the floating state, and the voltage of the DATA+ terminal 25a approaches the voltage close to GND. In this case, in the receiver circuit 40 for image data shown in FIG. 4, the DATA− terminal also gets in floating state, and the current IR of the first constant current source 41 flows in the path of Tr 1→Tr 2→DATA+ terminal 46a, and the current IR from the second constant current source 43 flows in the path of Tr 7→Tr 8→RM→DATA− terminal 46a. As a result, an amplitude voltage V (V=IR×RM) is generated in the terminal resistance RM. At this time, the voltage of the DATA+ terminal 46a is lower by V than that of the DATA− terminal 46b. As a result, the Tr 4 gets closer to OFF state and the Tr 6 gets closer to ON in the amplifier stage 42, and the output of the OUT terminal 44 and the OUT_B terminal 45 respectively gets high and low. Accordingly, the OUT terminal 44 outputs at a high level and the OUT_B terminal 45 outputs at a low level. The DATAOUT from the latch circuit 47 are outputted at a low level. On the other hand, the STP signal generating circuit 48 outputs the STPOUT at a low level because the signals inputted into NAND 3 (the signals from the OUT terminal 44 and the signals from OUT_B terminal 45) are mutually inverted signals.

Thus, when the STP signal is low, image data DATA+/− which are current signals are transmitted in the data line 32a and the data line 32b, and are converted into voltage signals DATAOUT by the receiver circuit 40. The STP signal generating circuit 48 in the receiver circuit 40 generates low STPOUT. DATAOUT and STPOUT are outputted to the S/P conversion circuit 68.

We shall now explain the case in which the STP signals inputted into the transmitter circuit 24 are high.

At this time, as FIG. 3 shows, two transistors Tr10 and Tr11 are both turned OFF irrespective of image data IND+/− because the STP signals are at a high level, both the DATA+ terminal 25a and the DATA− terminal 25a get in the floating state. As a result, in the receiver circuit 40 for image data shown in FIG. 4, the current path for the first constant current source 41 and the second constant current source 42 is cut off, and the potential of the DATA+ terminal 46a and the DATA− terminal 46b both approaches the VDD potential. The size (gate width) of the transistor Tr3 and the transistor Tr5 is adjusted in advance so that the OUT terminal 44 and the OUT_B terminal 45 may be at a high level when the DATA+ terminal 46a and the DATA− terminal 46b are at the same potential. By this setup, the fact that the DATA+ terminal 25a and the DATA− terminal 25b on the side of the transmitter circuit 24 have a high impedance is notified to the receiver circuit 40 side, and the OUT terminal 44 and the OUT_B terminal 45 output at a high level. Consequently, as both two signals inputted into the NAND 3 turn high, the STPOUT is outputted at a high level. Also, in the latch circuit, the DATAOUT maintains the previous state.

Thus, when the STP signal is high, no current flows in the data line 32a and the data line 32b. The STP signal generating circuit 48 in the receiving unit 60 generates high STPOUT, and the latch circuit 47 maintains the previous state. The DATAOUT and the STPOUT are outputted to the S/P conversion circuit 68.

In other words, the fact that the STPOUT is low means that current flows in the data line 32a or the data line 32b and that the image data DATA+/− are transmitted. Hereinafter, this state is referred to as the Tx-Rx working state. The fact that the STPOUT is high shows that no current flows in any of the two data lines, and that no image data are being transmitted. Hereinafter, this state is referred to as Tx-Rx not working state.

Now we shall describe the adjustment of the transistors Tr 3 and Tr 5 to set them in such a way that the OUT terminal 44 and the OUT_B terminal 45 may be at a high level when the DATA+ terminal 46a and the DATA− terminal 46b in the receiver circuit 40 shown in FIG. 4 are at the same potential. Normally, if the current mirror effect is created by Tr 1:Tr 3=Tr 7:Tr 5=Tr 2:Tr 4=Tr 8:Tr 6=n:1, when the DATA+ terminal 46a and the DATA− terminal 46b have the same potential, the Tr 4 and Tr 6 of the amplifier stage 42 are neither in the ON nor in the OFF state. As a result, the OUT terminal 44 and the OUT_B terminal 45 settle down at an intermediate potential. Therefore, if the gate width of the Tr 3 and Tr 5 is enlarged and their current capacity is increased to some extent, the current mirror is thrown off balance and the OUT terminal 44 and the OUT_B terminal 45 output at a high level even if the DATA+ terminal 46a and the DATA− terminal 46b have the same potential. However, if the size of the Tr 3 and Tr 5 is enlarged too much, in the normal state (in other words the state where current flows in any one of the data line 32a and the data line 32b), it will be no longer possible to amplify even if the difference of potential between the DATA+ terminal 46a and the DATA− terminal 46b is V. Therefore, it is preferable to adjust the transistors according to the amplitude voltage level of the image data DATA+ and DATA−.

We shall now describe the transmitter circuit 26 for clock signals and the receiver circuit 50 for clock signals.

Figure 5:
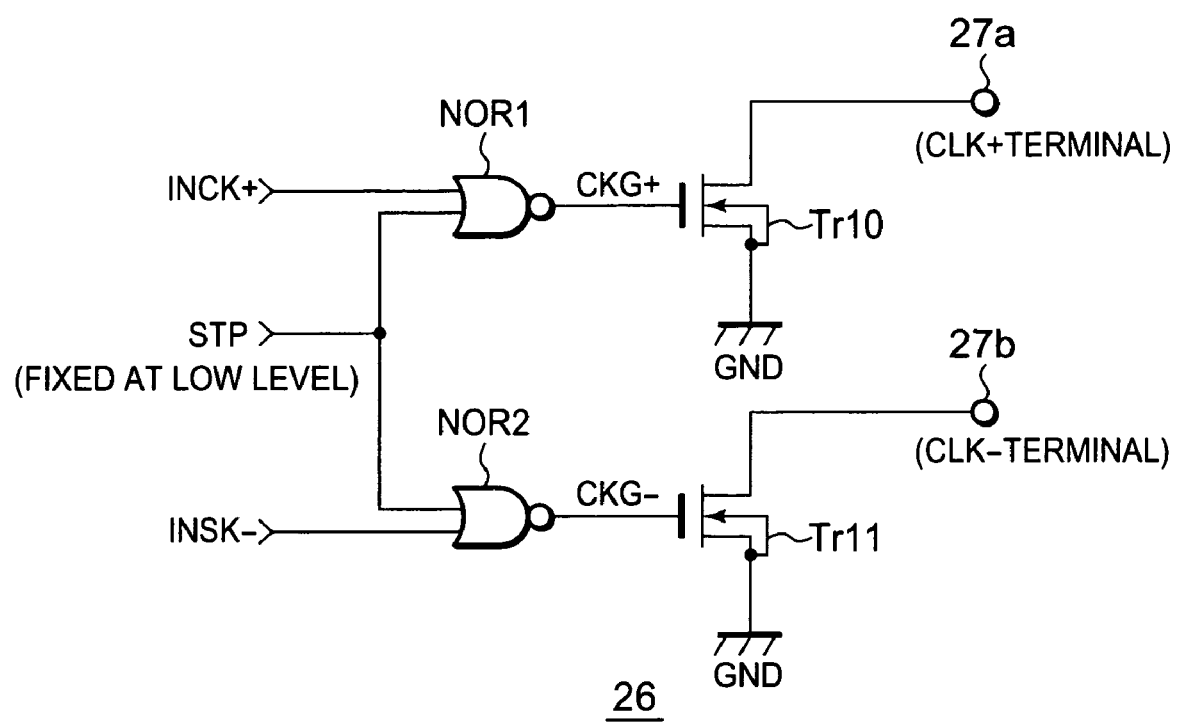
FIG. 5 is an illustration showing the configuration of the transmitter circuit for clock signals in the transmitting unit shown in FIG. 2.

FIG. 5 shows the configuration of the transmitter circuit 26. Like the transmitter circuit 24, the transmitter circuit 26 includes two NOR logics NOR 1 and NOR 2 and two Nch open train transistors Tr 10 and Tr 11 respectively connected with these two NOR logics. In order to facilitate understanding, we have assigned the same codes to mutually corresponding elements among various elements constituting the transmitter circuit 26 and the transmitter 24, and in the following descriptions and illustrations also, we may give the same code to elements constituting different functional blocks. It is understood that elements contained in different functional blocks are respectively different individual bodies.

In the transmitter circuit 26, the clock signals INCK+ and INCK− are inputted respectively into the NOR 1 and the NOR 2, and the STP signals are inputted into the two NOR logics. The STP signals inputted into the transmitter circuit 26 are fixed at a low level.

The clock signals INCK+ and INCK− are mutually inverted signals, and since the STP signals are fixed at a low level, mutually inverted signals (CKG+ and CKG−) are always inputted into the gate terminal of the two transistors in the transmitter circuit 26. By this setup, one of the Tr 10 and Tr 11 is turned ON while the other is turned OFF.

Figure 6:
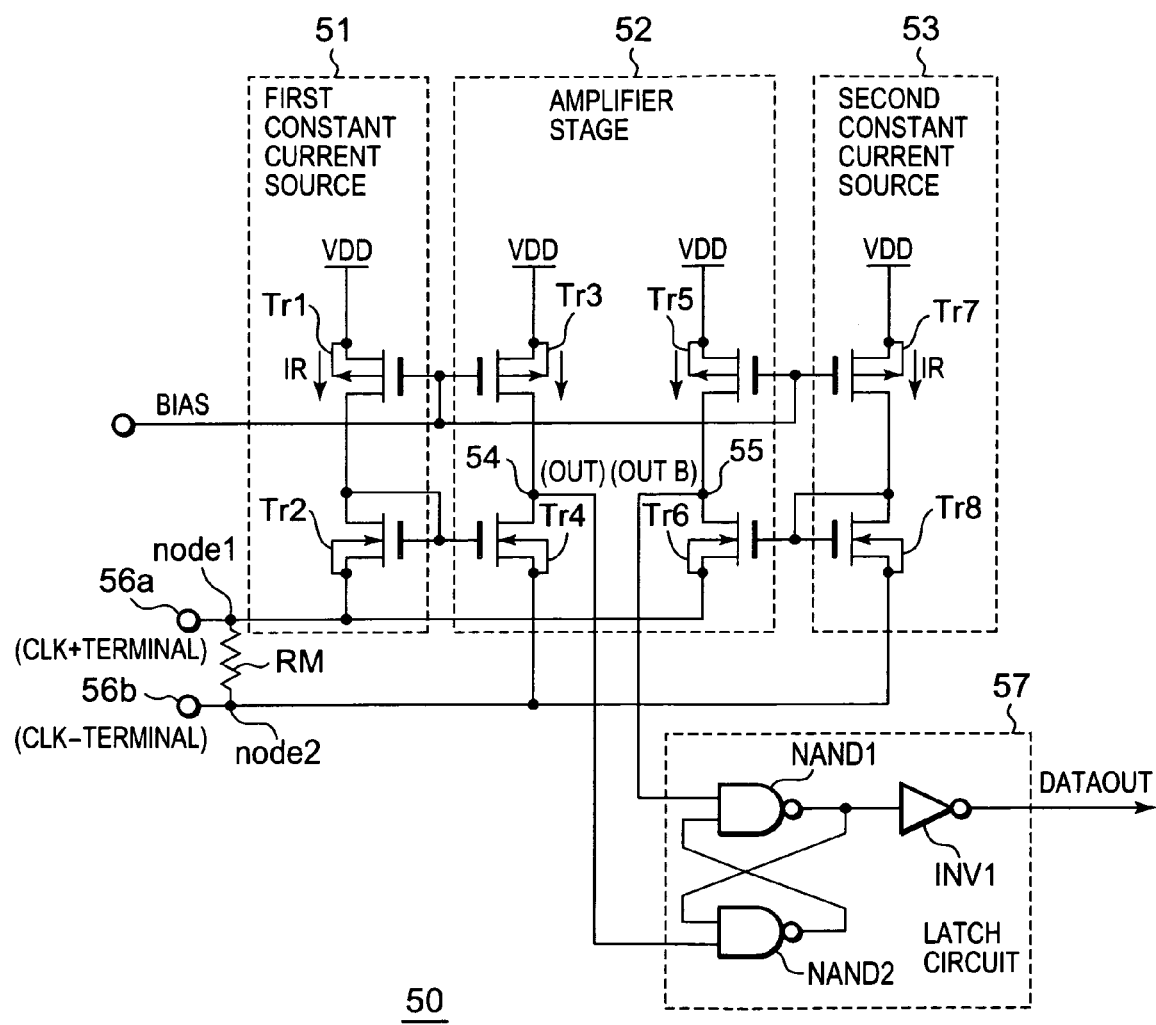
FIG. 6 is an illustration showing the configuration of the receiver circuit for clock signals in the receiving unit shown in FIG. 2.

FIG. 6 shows the configuration of the receiver circuit 50. The receiver circuit 50 includes a first constant current source 51 and a second constant current source 53 created by the voltage supplied from bias (BIAS shown in the figure), an amplifier stage 52, and a latch circuit 57. These various blocks are same as the mutually corresponding blocks in the receiver circuit 40, and we omit detailed description on their configuration and their operation. The receiver circuit 50 includes no block corresponding to the STP signal generating circuit 48 in the receiver circuit 40.

Since the STP signals inputted into the transmitter circuit 26 are always fixed at a low level, clock signals CLK+/− which are current signals are transmitted in the clock line 34a and the clock line 34b, and are converted into voltage signals CLKOUT by the receiver circuit 50. These CLKOUT also are outputted into the S/P conversion circuit.

Figure 7:
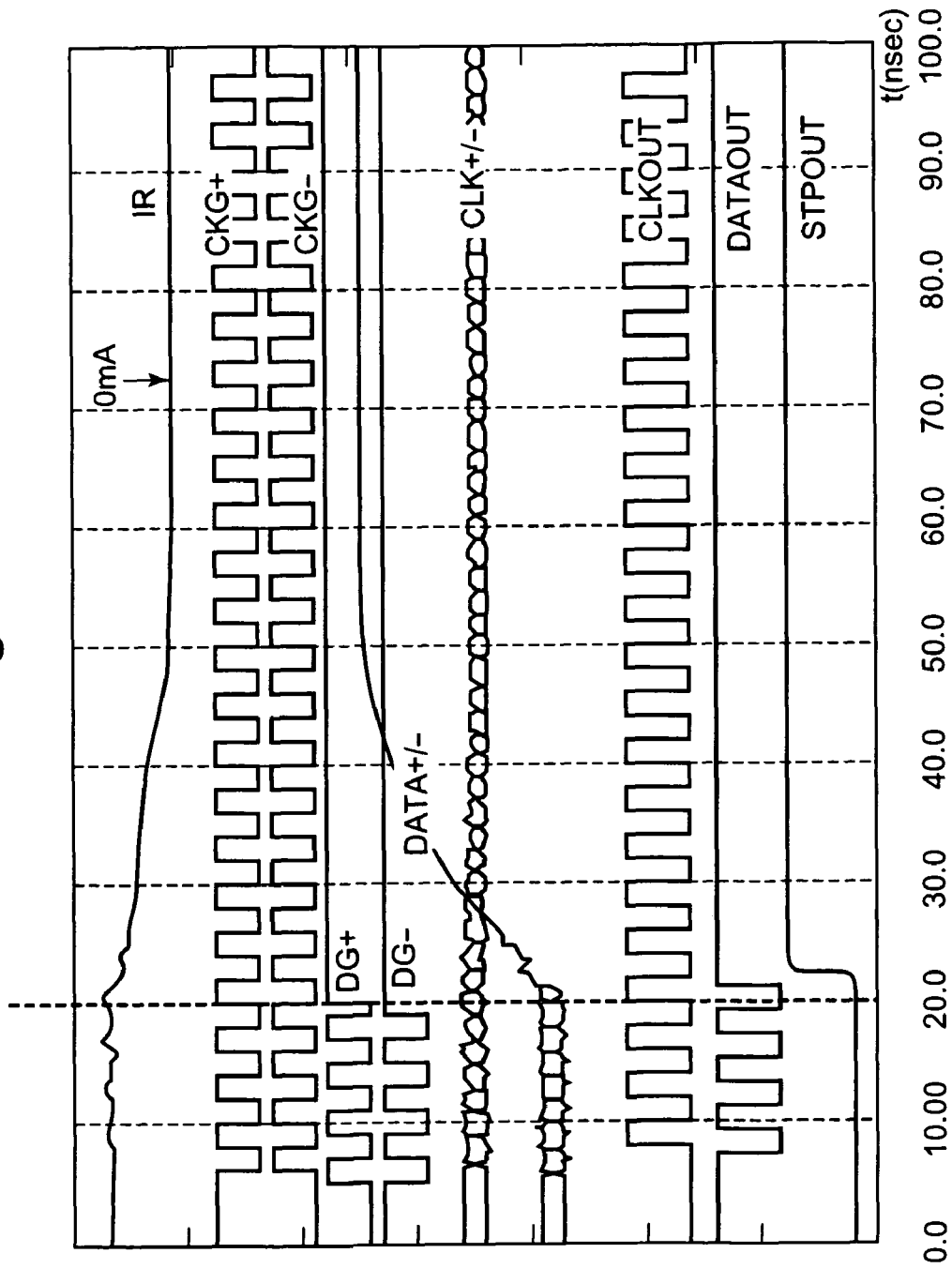
FIG. 7 is an illustration showing changes in the waveform of various signals resulting from the transition from the Tx-Rx working state to the Tx-Rx non-working state.
Figure 8:
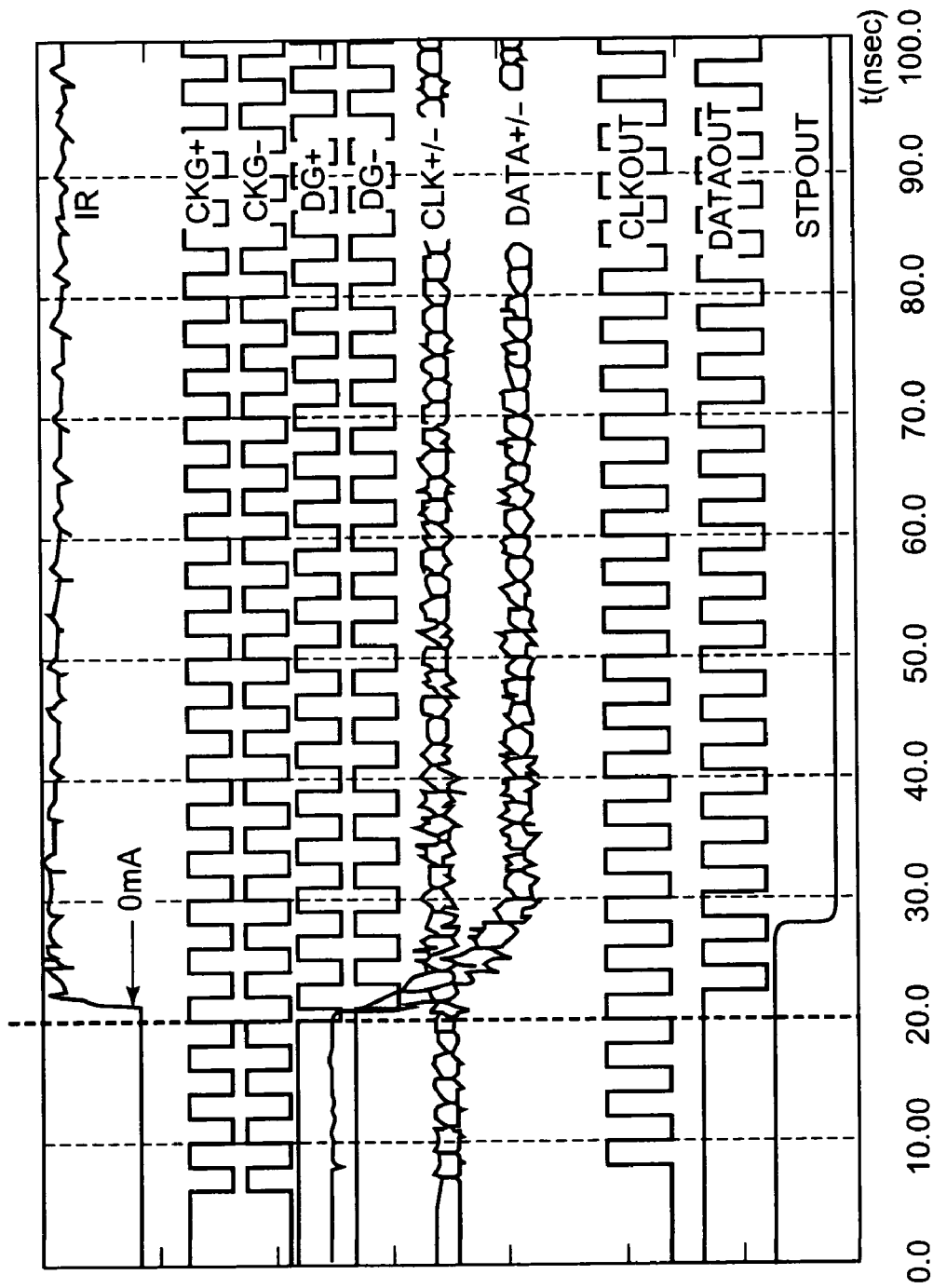
FIG. 8 is an illustration showing changes in the waveform of various signals resulting from the transition from the Tx-Rx non-working state to the Tx-Rx working state.

FIG. 7 and FIG. 8 show the waveform of various signals. FIG. 7 shows the waveforms of various signals at the time of transition from the Tx-Rx working state to the Tx-Rx not working state, and FIG. 8 shows the waveforms of various signals at the time of transition from the Tx-Rx not working state to the Tx-Rx working state. The horizontal axis in the figure represents time and the illustrated IR represents the current flowing in either one of the data line 32a and the data line 32b.

We shall explain first of all on the waveform relating to image data.

During 0-20 ns shown in FIG. 7, the STP signals inputted into the transmitter circuit 24 for image data are low. During this period of time, current IR flows in the data line 32a or the data line 32b. Image data DG+/− which are mutually inverted signals are inputted into the gate terminals of two transistors in the transmitter circuit 24 for image data, and the DATA+/− are transmitted by the data line 32a and the data line 32b. DATAOUT generated based on the DATA+/− are outputted from the latch circuit 47 of the receiver circuit 40 for image data, and STPOUT are outputted at a low level from the STP signals generating circuit 48. In other words, during this period of time, the data transmission path is in the Tx-Rx working state.

At a point in time close to 20 ns, the STP signals inputted into the transmitter circuit 24 for image data are switched to "high". As described above, at this time, the current path for the first constant current source 41 and the second constant current source 43 of the receiver circuit 40 is cut off, and no current flows in any one of the data line 32a and the data line 32b. The potential of both the DATA+ terminal 46a and the DATA− terminal 46b of the receiver circuit 40 approach the VDD potential. In the example shown in FIG. 7, as it was detected that at a point of time close to 25 ns the DATA+ terminal 46a and the DATA− terminal 46b have acquired the same potential, the OUT terminal 44 and the OUT_B terminal 45 output at a high level. As a result, STPOUT are outputted at a high level. This Tx-Rx not working state lasts until the STP signals inputted into the transmitter circuit 24 returns to the low level.

Since the STP signals inputted into the transmitter circuit 26 for clock signals are fixed at a low level, as far as clock signals are concerned, current flows in any one of the clock line 34a and the clock line 34b, and CKG+/− which are mutually inverted signals are inputted in the gate terminals of the two transistors in the transmitter circuit 26 for clock signals. CLK+/− are transmitted by the clock line 34a and the clock line 34b. CLKOUT generated based on the CLK+/− are outputted from the latch circuit 57 of the receiver circuit 50 for clock signals.

During the period of 0-20 ns shown in FIG. 8, the STP signals inputted into the transmitter circuit 24 for image data are high, and each waveform is identical to the waveform during the period of 20-100 ns. At a point near 20 ns, the TPS signals inputted into the transmitter circuit 24 are switched to low. This causes current IR to flow in the data line 32a or the data line 32b, and the waveform of each signal will be identical to the waveform of the corresponding signals during the period of 0-20 ns shown in FIG. 7. However, at this time, it takes a certain length of time from the moment when the DATA+ terminal 46a and the DATA− (sic) in the receiver circuit 40 transits from the VDD potential to the normal state when the potential close to the GND at the time of Tx-Rx working state is realized. In the case of FIG. 8, at the point of time close to 30 ns, when a voltage V (V=IR×RM) has developed between the DATA+ terminal 46a and the DATA− terminal 46b, STPOUT is outputted at a low level.

Synchronizing with the CLKOUT from the receiver circuit 50 for clock signals, the S/P conversion circuit 68 acquires the DATAOUT and the SPTOUT from the latch circuit 47 and the STP signal generating circuit 48. When the SPTOUT is low, it acquires display data and outputs the same to the output circuit 70 by converting the DATAOUT inputted serially into parallel signals and making other similar operations. On the other hand, when the SPTOUT have become high, it outputs the display data that had been outputted a drive timing before.

Thus, in the image display device 100 according to this embodiment, since the transmitter circuit 24 has cut off the supply of current from the receiving unit 60 to the data line 32a and the data line 32b by keeping both the DATA+ TERMINAL 25A AND THE data− terminal 25b in a floating state when the STP signal inputted into the transmitter circuit 24 is high, it is possible to eliminate the wiring cables for transmitting the control signal for cutting current and restrict the number of wiring cables. In this way, the number of signal lines of the image display device can be reduced, and this is particularly advantageous in a mobile phone in which the hinge between the housing and the display panel is narrow.

According to the image display device 100 according to this embodiment, when the pixel whose image data had been transmitted a drive timing before and the image data of the adjacent pixel are equal, the transmission of image data is stopped so that no current flows in any one of the data line 32a and the data line 32b. By adopting such a setup, for displaying uniform images such as wholly white display, the amount of image data to be transmitted can be reduced and at the same time the consumption of power can be restricted.

In the image display device 100 according to this embodiment, although the STP signals inputted into the transmitter circuit 24 are not directly transmitted to the receiving unit 60, the STP signal generating circuit 48 in the receiver circuit 40 for image data generates signals corresponding to the STP signals inputted to the transmitter circuit 24. By this setup, the S/P conversion circuit 68 can know that the image data are not transmitted even if there is no wiring cable to transmit the STP signals and can take actions corresponding thereto (outputting display data a drive timing before).

Furthermore, according to the technology disclosed in the $2^{nd}$ patent application, the STP signals are transmitted by the CMOS transmission method and the data signals are transmitted by the CMADS method. Because of the difference of the two transmission methods, it is difficult to harmonize the timing of the STP signals and the data signals. On the other hand, since the image display device 100 according to this embodiment uses the same signal line to transmit image data and STP signals, it is easy to harmonize the timing of stopping the transmission of image data, cutting off current, resuming the transmission of image data and resuming the supply of current.

Since the elimination of wiring cables for transmitting the STP signals does not change the physical layer of the CMADS transmission system, this technology is advantageous in terms of the facility of developing and in terms of cost.

Figure 9:
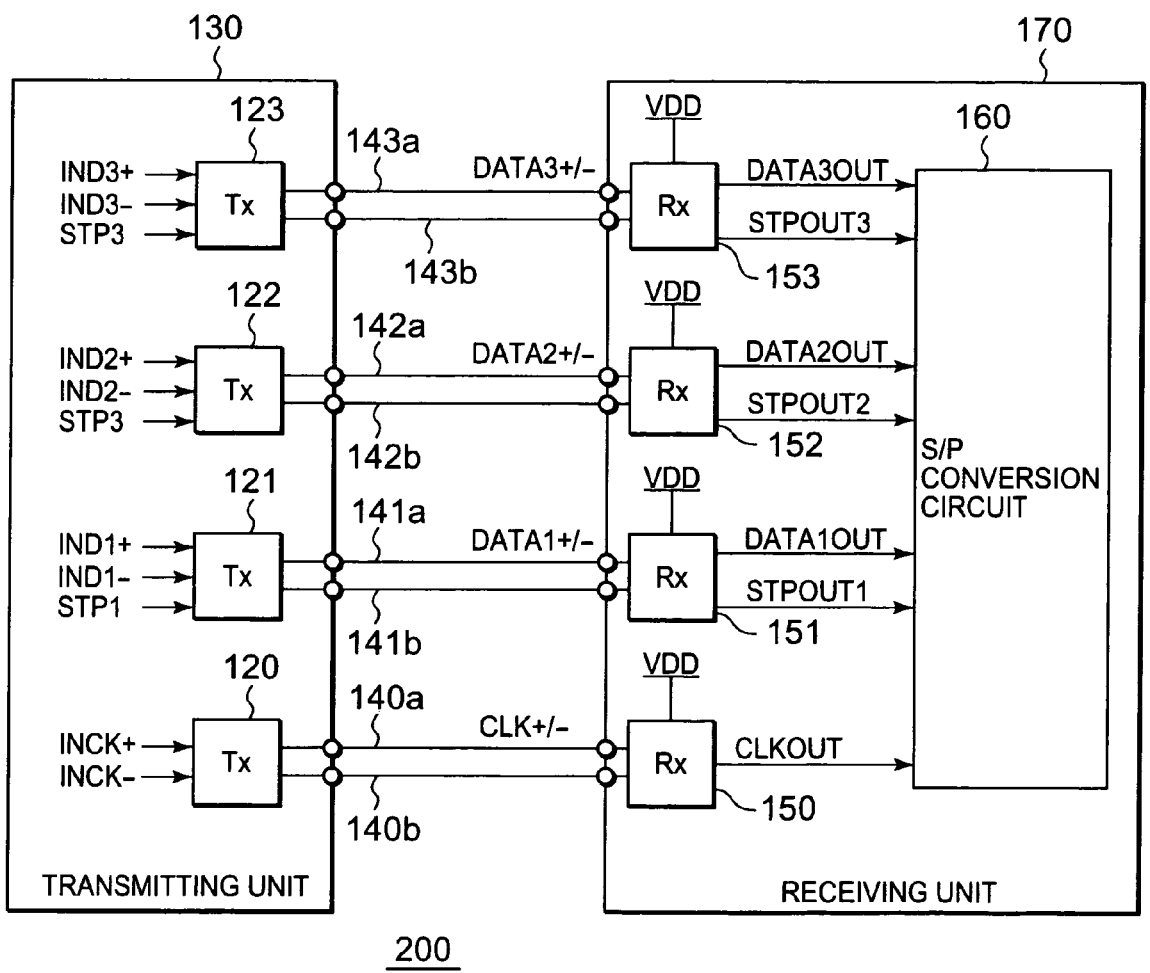
FIG. 9 is a block diagram showing the configuration of a transmitter/receiver according to another embodiment of the present invention.
Figure 10:
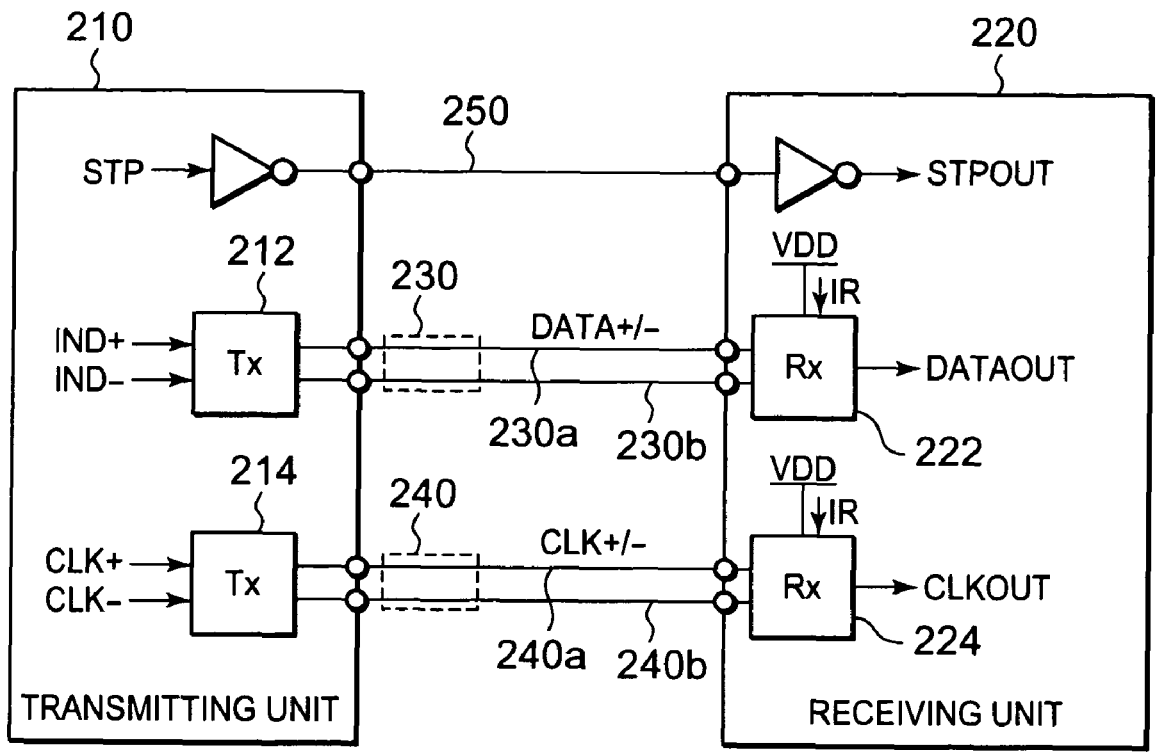
FIG. 10 is an illustration for describing a related art.

FIG. 9 shows a transmitter/receiver 200 according to another embodiment of the present Invention. This transmitter/receiver 200 can be applied for example in the image display device 100 in the place of the transmitting/receiving unit shown in FIG. 2.

The transmitter/receiver 200 includes a transmitting unit 130 for transmitting data and a receiving unit 170 for receiving data. The transmitting unit 130 includes a transmitter circuit 120 for clock signals and a plurality (three in the example shown) of transmitter circuits 121-123 for image data. The receiving unit 170 includes a receiver circuit 150 for clock signals, a plurality (a number equal to the number of transmitter circuits for image data) of receiver circuits 151-153, and a S/P conversion circuit 160. A pair of wiring cables is laid between each transmitter circuit and the receiver circuit corresponding to this transmitter circuit.

The transmitter circuit 120 for clock signals has the same configuration as that of the transmitter circuit 26 shown in FIG. 2, and the receiver circuit 150 has the same configuration as that of the transmitter circuit 26 shown in FIG. 2.

The transmitter circuits 121-123 for image data have the same configuration as that of the transmitter circuit 24 shown in FIG. 2, and the receiver circuits 151-153 have the same configuration as that of the receiver circuit 40 shown in FIG. 2.

In other words, the transmitter/receiver 200 has a plurality of pairs of transmitter circuit and receiver circuit for transmitting image data and enables to transmit more data.

For example, three pairs of transmitter circuit and receiver circuit are used for transmitting respectively R data, G data and B data. By adopting this setup, R data, G data and B data are transmitted mutually independent pairs, and it is possible to control the stoppage and resumption of operation (i.e., whether current is allowed to flow in a pair of wiring cables provided for each pair) of the pair in charge of transmitting each of R data, G data and B data. For example, if the same R data continue, the operation of the pair in charge of transmitting R data can be stopped. The same rule applies to G and B.

In other words, by adopting such a setup, the same effect as that of the transmitting and receiving units shown in FIG. 2 can be obtained. At the same time, it is possible to control the operation of the transmitter circuit/receiver circuit for each R, G and B data, and therefore it is possible to realize efficiently low-consumption current.

Although the transmitter/receiver 200 shown in FIG. 9 include three pairs for image data, it is easily possible to operate make only a pair or to operate only two pairs. For example, in the case of making only the pair of the transmitter circuit 121 and the receiver circuit 151 operate, the STP signals inputted into the transmitter circuit 122 and the transmitter circuit 123 are turned high, and the operation of the pair of the transmitter circuit 122 and the receiver circuit 152 and of the pair of the transmitter circuit 123 and the receiver circuit 153 is stopped. In this case, the STPOUT from the receiver circuit of these two pairs are outputted high, while the STPOUT from the receiver circuit 151 are outputted low. Depending on the combination of the three STPOUT, it is possible to adapt the S/P conversion circuit 160 to any one of the specification of making only a pair operate, making only two pairs operate, and making all the three pairs operate. Therefore, it is not necessary to set the specification for the S/P conversion circuit 160 by using other signal lines.

So far we have described the present Invention based on embodiments. The embodiment is an indication of examples, and may be adapted by various changes, additions or subtractions as long as they do not deviate from the main purpose of the present Invention. Those persons skilled in the art understand that variations to which these changes, additions or subtractions have been applied are also within the scope of the present Invention.

For example, the image display device 100 shown in FIG. 1 includes the mechanism for stopping the transmission of image data and for cutting off the supply of current to the data lines when the same image data continue. However, the transmitting and receiving technology according to the present Invention is not limited to this mode.

For example, this technology can be applied to the case of transmitting image data by reducing the number of colors. Specifically, in the normal state, STP signals destined to be low are inputted into the transmitting unit, and at the time of transmitting dummy, STP signals destined to be high are inputted. In this case also, it is possible to cut off the current for flowing in the wiring cable when no image data are outputted without any wiring cable for transmitting STP signals.

In this case, it is not necessary to create any circuit for generating control signals corresponding to STP signals (STPOUT signals) in the receiving unit.

In the transmitting unit 20 of the image display device 100 shown in FIG. 1, we showed an example of comparing image data between adjacent single pixels. However, for example, image data of pixel groups constituted by a plurality of pixels may be compared with image data of image groups constituted by the same number of pixel groups and adjacent to these pixel groups or image data of one line may be compared with the image data of the following one line adjacent to this line.

The transmitting unit is arranged in a housing having a number key, for example, for a mobile phone. The receiving unit is arranged in the other housing having a display panel for the mobile phone. Those housing are connected flexibly or rotatably by a hinge.

Incidentally, any optional combination of the constituent elements mentioned above and any methodological or systematic expression of the present Invention are effective modes of the present Invention.

Further, it is noted that, Applicant's intent is to encompass equivalents of all claim elements, even if amended later during prosecution.

What is claimed is:

1. A transmitting and receiving system comprising:
a pair of image data wiring lines;
a data transmitting unit, which, when the image data is outputted, connects a first image data wiring line of said pair to a reference electric potential, and make a state of a second image data wiring line of said pair to a floating state;
a data receiving unit which generates a pair of complementary current signals when said first image data wiring line of said pair is connected to said reference electric potential and said second image data wiring line of said pair is to said floating state, and generates a display signal based on said pair of complementary current signals;
a pair of clock wiring lines; and
a clock transmitting unit, responsive to a clock signal to connect a first clock wiring line of said pair to a reference electric potential, and to make a state of a second clock wiring line of said pair to a floating state, regardless of an image data being outputted from said data transmitting unit or not.

2. The transmitting and receiving system of claim 1, further comprising:
a clock receiving unit, which generates a pair of complementary current signals, based on a state of said first clock wiring line of said pair of clock wiring lines, to generate a clock signal.

* * * * *